United States Patent
Li et al.

(10) Patent No.: US 9,916,140 B2
(45) Date of Patent: Mar. 13, 2018

(54) METHOD OF GENERATING END-TO-END WEB APPLICATION FROM TOOLING

(71) Applicant: International Business Machines Corporation, Armonk, NY (US)

(72) Inventors: Jeff J. Li, Parkland, FL (US); Ivan M. Milman, Austin, TX (US); Wendi L. Nusbickel, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 126 days.

(21) Appl. No.: 14/666,110

(22) Filed: Mar. 23, 2015

(65) Prior Publication Data
US 2016/0283203 A1  Sep. 29, 2016

(51) Int. Cl.
*G06F 9/44* (2006.01)
*G06F 17/30* (2006.01)

(52) U.S. Cl.
CPC ............ *G06F 8/38* (2013.01); *G06F 17/3089* (2013.01)

(58) Field of Classification Search
CPC .............................. G06F 8/38; G06F 17/3089
USPC ........................................................ 717/106
See application file for complete search history.

(56) References Cited

U.S. PATENT DOCUMENTS

| | | | |
|---|---|---|---|
| 7,451,403 B1 * | 11/2008 | Srinivasan | G06F 8/10 715/762 |
| 8,099,438 B2 | 1/2012 | Calahan | |
| 8,140,596 B2 | 3/2012 | Brown et al. | |
| 9,734,044 B2 * | 8/2017 | Harden | G06F 11/3684 |
| 2003/0084120 A1 * | 5/2003 | Egli | H04L 29/06 709/218 |
| 2005/0246716 A1 * | 11/2005 | Smith | G06F 9/465 719/315 |
| 2005/0251533 A1 | 11/2005 | Harken et al. | |
| 2006/0179118 A1 * | 8/2006 | Stirbu | G06F 3/14 709/217 |
| 2007/0100967 A1 * | 5/2007 | Smith | G06F 8/20 709/219 |
| 2007/0136324 A1 | 6/2007 | Xu et al. | |
| 2010/0115023 A1 * | 5/2010 | Peled | G06F 17/3089 709/203 |

(Continued)

OTHER PUBLICATIONS

Troy Giunipero, "Creating a Simple Web Application Using a MySQL Database," https://docslide.net/documents/creating-a-simple-web-application-using-a-mysql-database-netbeans-ide-tutorial.html published on Dec. 2, 2014, 19 pages.

(Continued)

*Primary Examiner* — John Chavis
(74) *Attorney, Agent, or Firm* — Patterson + Sheridan, LLP

(57) ABSTRACT

Techniques describe generating an end-to-end web application. A user interface (UI) design tool generates a first application that includes a UI having one or more UI elements. One or more classifications of server properties (e.g., REST resource names, JSON names, CRUD actions, etc.) are mapped to each of the UI elements. A data schema is generated from the classifications. A machine-readable description of the data schema and mapped classifications is generated. The UI design tool generates a second application from the machine-readable description. The second application is an implementation of the UI of the first application and the machine-readable description.

20 Claims, 6 Drawing Sheets

(56) References Cited

U.S. PATENT DOCUMENTS

| | | |
|---|---|---|
| 2010/0281061 A1 | 11/2010 | Chen |
| 2011/0295865 A1 | 12/2011 | Carroll et al. |
| 2012/0323628 A1 | 12/2012 | Jaster et al. |
| 2013/0326087 A1* | 12/2013 | Storz .................. G06F 9/541 709/246 |
| 2014/0143310 A1* | 5/2014 | Peled ................ G06F 17/3089 709/203 |
| 2014/0359456 A1* | 12/2014 | Thiele .................. H04W 4/001 715/735 |
| 2016/0085793 A1* | 3/2016 | Davis ................ G06F 17/2235 707/690 |
| 2017/0195317 A1* | 7/2017 | Manza ................ H04L 63/0838 |

OTHER PUBLICATIONS

"List of rapid application development tools"; http://en.wikipedia.org/wiki/List_of_rapid_application_development_tools updated on Apr. 14, 2016, 5 pages.

"Visual authoring of HTML5 user interfaces—in the browser"; http://maqetta.org/ [Accessed on Aug. 25, 2017].

"Generating a basic Java EE web-application"; https://docs.jboss.org/author/display/FORGE/Generating+a+basic+Java+EE+web-application? sscc=t [Accessed online on Aug. 25, 2017].

\* cited by examiner

METHOD OF GENERATING END-TO-END WEB APPLICATION FROM TOOLING

BACKGROUND

Embodiments presented herein generally relate to web application development, and more specifically, to generating a web application user interface that includes back-end server components.

Web applications typically include a front-end user interface (UI) and a back-end service. The web application UI facilitates access to the service. Further, the development process of a web application is generally separated between the front-end and the back-end. During the development process, a front-end developer designs a UI and specifies, to the back-end developer, server requirements for the UI, e.g., a REST (Representational State Transfer) function of each element in the UI, an action each element performs, etc. The front-end developer may also generate sample data that the back-end developer may use to test the application. In turn, the back-end developer implements the service according to the requirements and test data provided by the front-end developer. The UI and the service are then integrated.

Often, the front-end developer can miscommunicate specifications, or the back-end developer can misunderstand the specifications set by the front-end developer. Consequently, the front- and back-end developers need to repeat this process several times before generating a version of the web application that meets the specifications of the front-end developer. Integrating the front-end UI with the back-end server components of a web application can be a complex and time-consuming process that requires significant back-and-forth communication between the front-end UI developer and the back-end developer. This process can adversely affect product schedules even when specifications are clearly communicated and implemented. Further, the current approach to web application development often requires the front-end developer to accommodate the UI to the abilities of the back-end developer. As a result, the end user may have difficulty using the UI.

SUMMARY

One embodiment presented herein describes a method for generating a web application. The method generally includes generating a first application. The first application includes a UI having one or more UI elements. The method also includes mapping one or more server properties to each of the UI elements. A data schema is generated from the mapped one or more server properties. A machine-readable description of the data schema and the mapped one or more server properties is generated. A second application is generated from the machine-readable description. The second application implements the UI of the first application and the machine-readable description.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DETAILED DESCRIPTION

Figure 1:
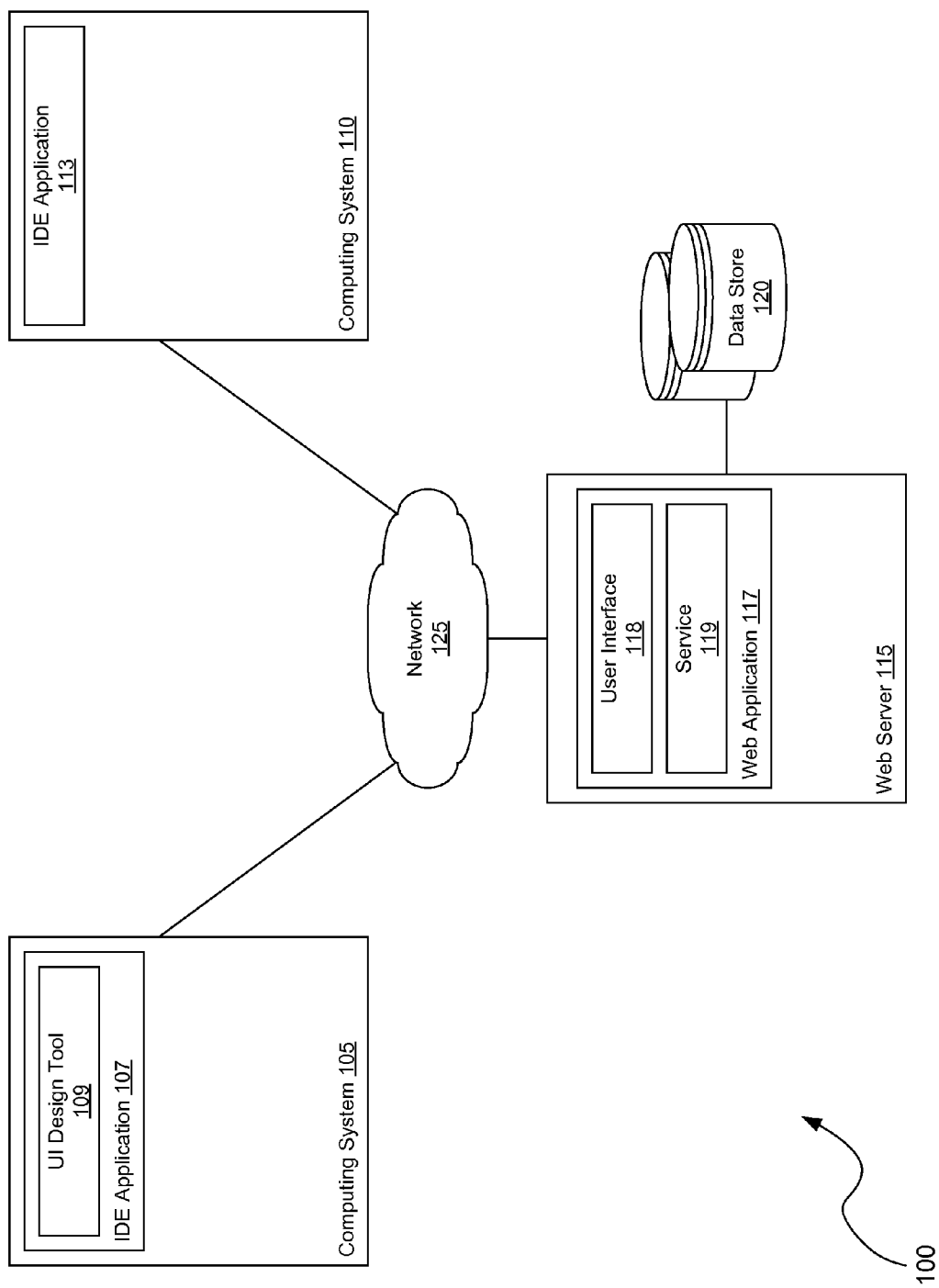
FIG. 1 illustrates an example computing environment, according to one embodiment.

Embodiments presented herein describe techniques for generating an end-to-end web application that includes a front-end user interface (UI) and a back-end service. In one embodiment, an integrated design environment (IDE) application includes a UI design tool. Generally, the UI design tool allows a front-end developer to drag-and-drop UI elements (e.g., widgets) from a palette onto a canvas representing the UI. The UI design tool may then generate a front-end application.

In one embodiment, the UI design tool classifies each element of the UI with back-end server components, such as REST (Representational State Transfer) resource names, JSON (Javascript Object Notation) names, CRUD (create, read, update, delete) actions, and the like. Further, the front-end developer may assign such components to each UI element. For example, assume that the front-end developer designs a UI for a user management application using the UI design tool. The UI may include various elements, such as a "Get Users" button. The front-end developer may define the "Get Users" button as having several classifications, such as a "Get" CRUD action.

Once the developer completes designing the UI and classifying UI elements, the developer can indicate to the UI design tool to generate the application. In turn, the UI design tool automatically generates server components associated with each UI element. For example, the UI design tool may generate REST target URLs, a JSON schema, and CRUD actions based on developer specifications (or default values). The UI design tool then generates a WADL (Web Application Description Language) description for the web application based on the REST URLs, JSON schema, and CRUD actions. The WADL is used to generate server code. The UI design tool generates a JAX-RS (Java API for RESTful Web Services) service stub from the WADL. The service stub is a functional web application that includes the UI and back-end server components. A back-end developer may provide code that implements server connectivity between a client and the service stub.

Advantageously, automatically generating server-side components for UI elements of a web application simplifies the development process. That is, the UI design tool classifies server properties typically defined by a back-end developer during the process, such as REST resource names, target URLs, JSON data, and the like. Such properties specify how the front-end communicates with the server. Further, the WADL generated based on the properties describes how the properties are implemented on the server. As a result, this approach minimizes the amount of work required by the back-end developer to implement the service. Consequently, the front-end developer has a higher degree of control to obtain a UI design that matches intended specifications.

Note, the following uses Javascript Object Notation (JSON) as a reference example of a readable format for describing server attributes and values at a high level. However, one of ordinary skill in the art will recognize that various types of formats that perform similar functions may be adapted (e.g., YAML, XML, etc.). Further, the following uses Web Application Description Language (WADL) as a reference example of a machine-readable description of web applications. However, one of ordinary skill in the art will recognize that various types of formats for describing web services may also be adapted, such as WSDL (Web Service Definition Language).

FIG. 1 illustrates an example computing environment 100, according to one embodiment. As shown, computing environment 100 includes a computing system 105, computing system 110, and a web server 115, each connected via a network 125. Each of the computing systems 105 and 110 may be a physical computing system (e.g., a desktop computer, a laptop computer, etc.) or a virtual computing instance executing within a computing cloud. In one embodiment, the computing system 105 corresponds to a system of a front-end developer for a web application 117 (e.g., executing on the web server 115). The computing system 110 corresponds to a system of a back-end developer for the web application 117.

In one embodiment, the web application 117 includes a user interface (UI) 118 and a service 119. In this example, the UI 118 includes one or more HTML pages that allow a user to access functions of the service 119. The service 119 may allow the user to manage a list of customers in a data store 120. For example, the user can retrieve a listing of customer information from the data store 120 through one of the pages of the UI 118 (accessed via a web browser). The user can also add or delete customers or edit customer information through the UI 118. The front-end developer and the back-end developer collaborate to create the web application 117.

In one embodiment, the computing system 105 includes an integrated development environment (IDE) application 107. The IDE application 107 itself includes a UI design tool 109. The front-end developer can drag-and-drop UI elements (e.g., buttons, text fields, radio boxes, etc.) from a design palette onto a canvas that represents the UI for a given page. The UI design tool 109 generates a non-functional application that includes the UI elements as arranged by the front-end developer.

The computing system 110 includes an IDE application 113. The back-end developer uses the IDE application 113 to implement features of each of the UI elements as specified by the front-end developer. For example, the back-end developer may write code corresponding to RESTful resources (e.g., HTTP requests to send to the web server 115) to associate with a given UI element. As another example, the back-end developer writes code corresponding to CRUD actions (e.g., create, read, update, and delete actions that map to HTTP POST, GET, PUT, and DELETE methods) to associate with the UI element. Typically, such a process involves a considerable amount of trial-and-error between the front-end developer and the back-end developer.

In one embodiment, the UI design tool 109 is configured to automatically generate a functional web application that includes a UI along with server components associated with each element of the UI. For example, the UI design tool 109 can classify each page of the UI with one or more REST resource names, JSON names, and the like, as specified by the front-end developer (or using some default value for a given page). Further, the UI design tool 109 can classify each element of the UI with one or more REST resource names, JSON names, and the like, as specified by the front-end developer (or using some default value).

In one embodiment, the UI design tool 109 generates a JSON schema from the UI element classifications. The JSON schema describes how the application communicates information to the server. For instance, the JSON schema may describe properties associated with an object. For example, assume the application manages a listing of "user" objects. The JSON schema may break down a user object into different attributes, such as name, address, phone number, etc.

In one embodiment, the UI design tool 109 generates a WADL (Web Application Description Language) format from the JSON schema and the UI element classifications. The WADL represents requirements for the service 119 to support the UI 118. The WADL includes the server properties classified to the UI elements (e.g., target REST URLs, CRUD actions, and the like).

In one embodiment, the UI design tool 109 generates a JAX-RS (Java API for RESTful Web Services) service stub. The service stub is a functional web application that includes the UI as arranged by the front-end developer as well as the server modules that support each UI element. A back-end developer can provide code that connects the service stub to the data store 120.

Figure 2:
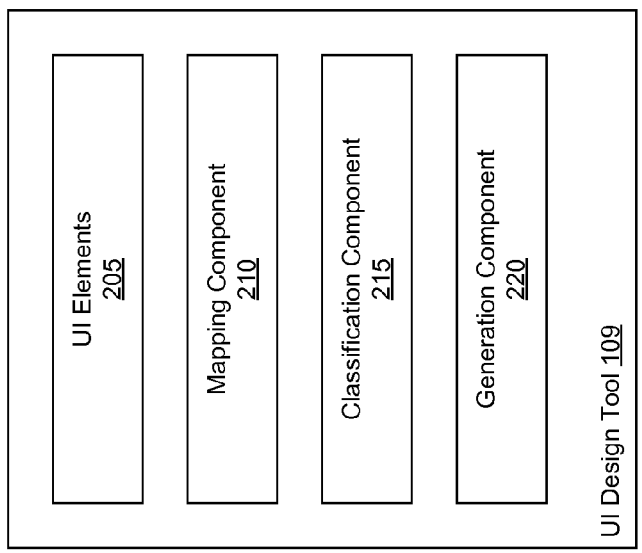
FIG. 2 illustrates the user interface (UI) design tool shown in FIG. 1, according to one embodiment.

FIG. 2 further illustrates the UI design tool 109, according to one embodiment. The UI design tool 109 includes one or more UI elements 205, a mapping component 210, a classification component 215, and a generation component 220.

In one embodiment, the UI elements 205 include buttons, text fields, containers, and the like. The design tool 109 provides each of the UI elements 205 in a palette. The front-end developer may drag-and-drop one or more UI elements 205 from the palette to a canvas in the UI design tool 109.

In one embodiment, the classification component 215 associates server properties with pages of the UI (if any) and the UI elements 205 arranged by the front-end developer. Examples of server properties include REST resource names, JSON names, CRUD actions, and the like. The front-end developer can specify which server properties to classify to a given UI element. For example, assume that the front-end developer creates a button UI element 205 for a UI page in the application. The front-end developer can specify a CRUD action for the UI element 205 in the UI design tool 109. For example, the CRUD action may trigger a REST call for a given REST resource (e.g., a submit event, a new row event, and the like). The classification component 215 associates the CRUD action with the UI element. If the front-end developer does not specify a particular property to the UI element 205, the classification component 215 may associate a default property to the UI element 205. For example, assume that the developer does not specify a REST resource name to the UI element 205. In such a case, the classification component 215 can associate a default REST resource name to the UI element 205 (or, if specified, a REST resource name associated with the corresponding page).

In one embodiment, the mapping component 210 associates pages with a JSON object name. The JSON object name may be specified for a given page by the front-end developer. Further, the mapping component 210 associates each UI element to a JSON array. In one embodiment, the generation component 220 creates sample JSON data for a given UI page from the server properties. For example, the generation component 220 may create form field samples and grid row samples based on the CRUD actions associated with a UI element 205. To do so, the generation component 220 may trigger events associated with specified CRUD actions to identify matching UI elements 205.

In addition, the generation component 220 creates a JSON schema from the JSON data. As stated, the JSON schema describes how the resulting application communicates information to the back-end service. The schema may describe attributes of a given object. For example, for a user management web application, the schema may describe a "user" object as having attributes such as "name," "address," "phone number," etc. The generation component 220 can then create a WADL based on the JSON schema and server property classifications. The WADL describes RESTful web services and CRUD actions provided by each UI element 205. The WADL also describes the format in which values (e.g., object values) are returned by the application service.

In one embodiment, the generation component 220 creates a JAX-RS service stub from the WADL. The JAX-RS service stub, when compiled, is a functional application that includes the UI designed by the front-end developer along with server components associated with each page and UI element of the application. The service stub provides a framework used to provide a RESTful service. Further, the JAX-RS service stub includes an empty provider class that a back-end developer may later implement (e.g., to allow the resulting application to connect to a database provider, etc.).

Figure 3:
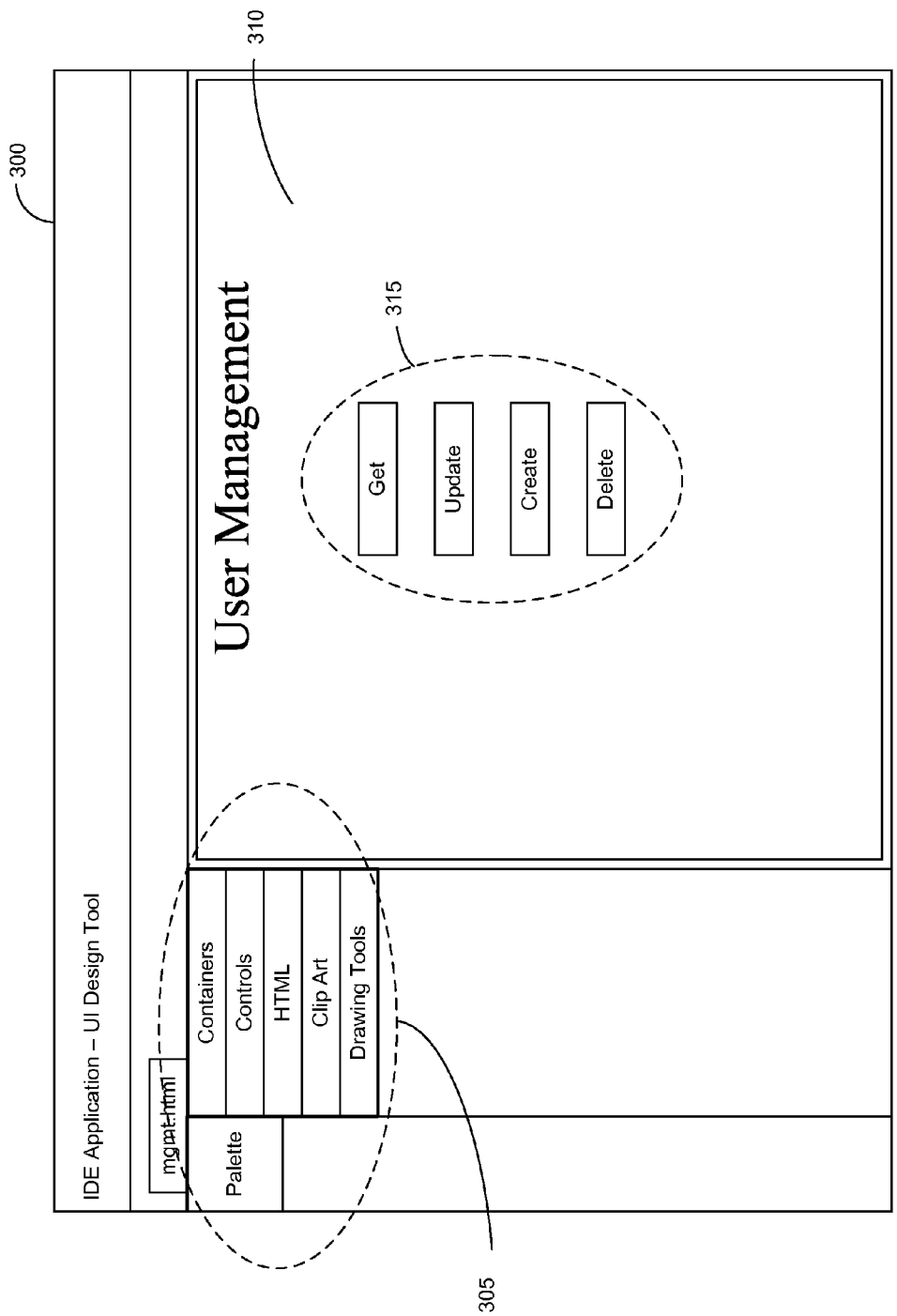
FIG. 3 illustrates an example UI design tool interface, according to one embodiment.

FIG. 3 illustrates an example UI design tool interface 300, according to one embodiment. Illustratively, the interface 300 includes a palette 300. The palette 300 providers a number of UI elements (e.g., containers, controls, HTML elements, etc.). The front-end developer can drag the UI elements onto a canvas 310, which represents a resulting UI for a web application. As shown, the canvas 310 includes several UI element buttons 315, labeled Get, Update, Create, and Delete.

Figure 4:
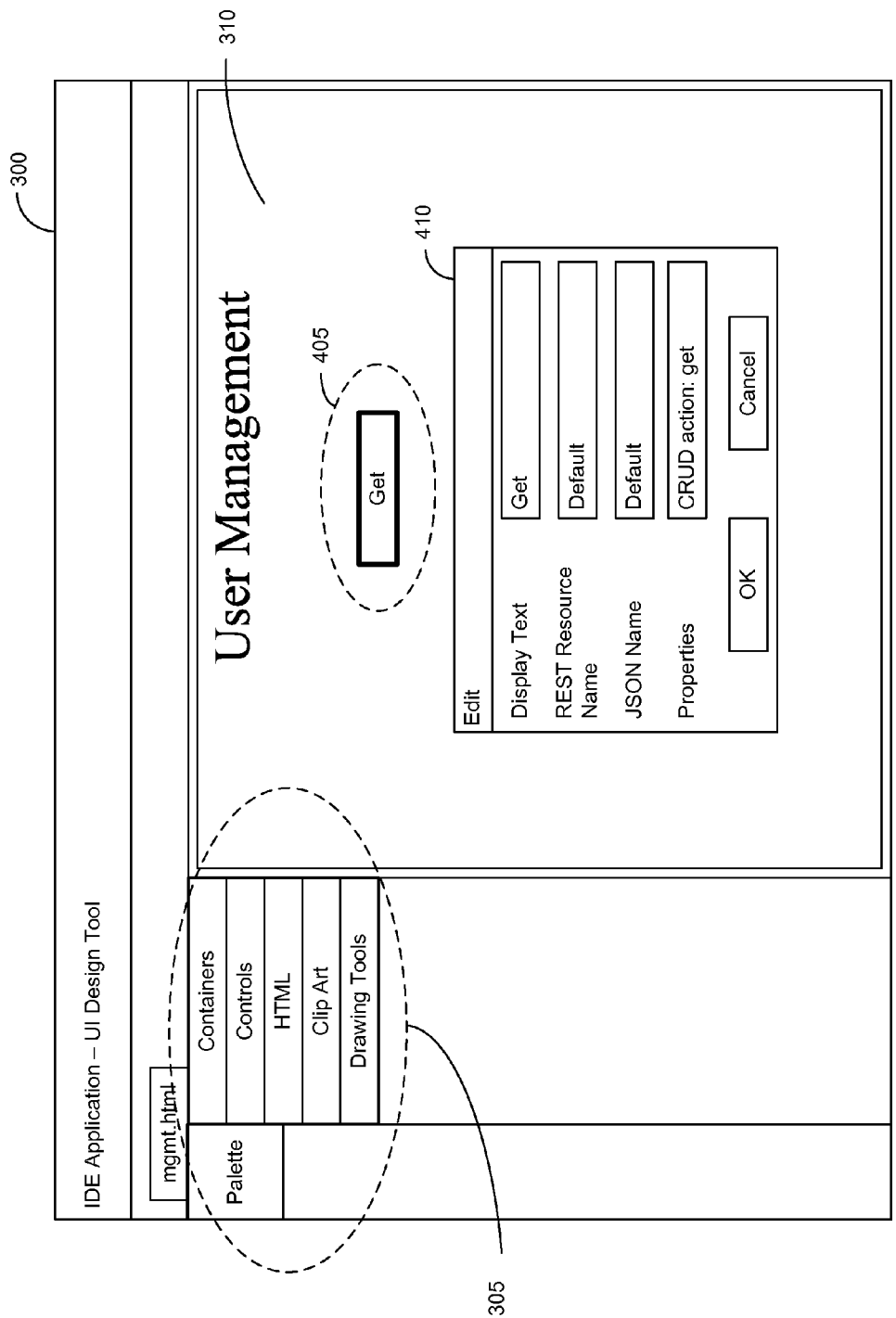
FIG. 4 further illustrates the example UI design tool interface described relative to FIG. 3, according to one embodiment.

FIG. 4 further illustrates the example UI design tool interface 300, according to one embodiment. As stated, the front-end developer may specify server properties for a given UI element. In this case, the front-end developer specifies properties for a Get button 405. For example, the front-end developer may open an edit box 410 that allows the developer to edit various properties of the Get button 405, such as Display Text, REST Resource Name, JSON Name, and other Properties. As shown, the front-end developer specifies a CRUD action corresponding to a HTTP GET action. The REST Resource Name and JSON Name fields remain with default values. In such a case, the classification component 215 associates the specified CRUD action to the Get button 405. Further, the classification component 215 associates a default REST resource name to the Get button 405. The default name may be based on the REST resource name associated with the page. The classification component 215 associates a default JSON name to the Get button 405. The default name may be based on the JSON name associated with the page.

Figure 5:
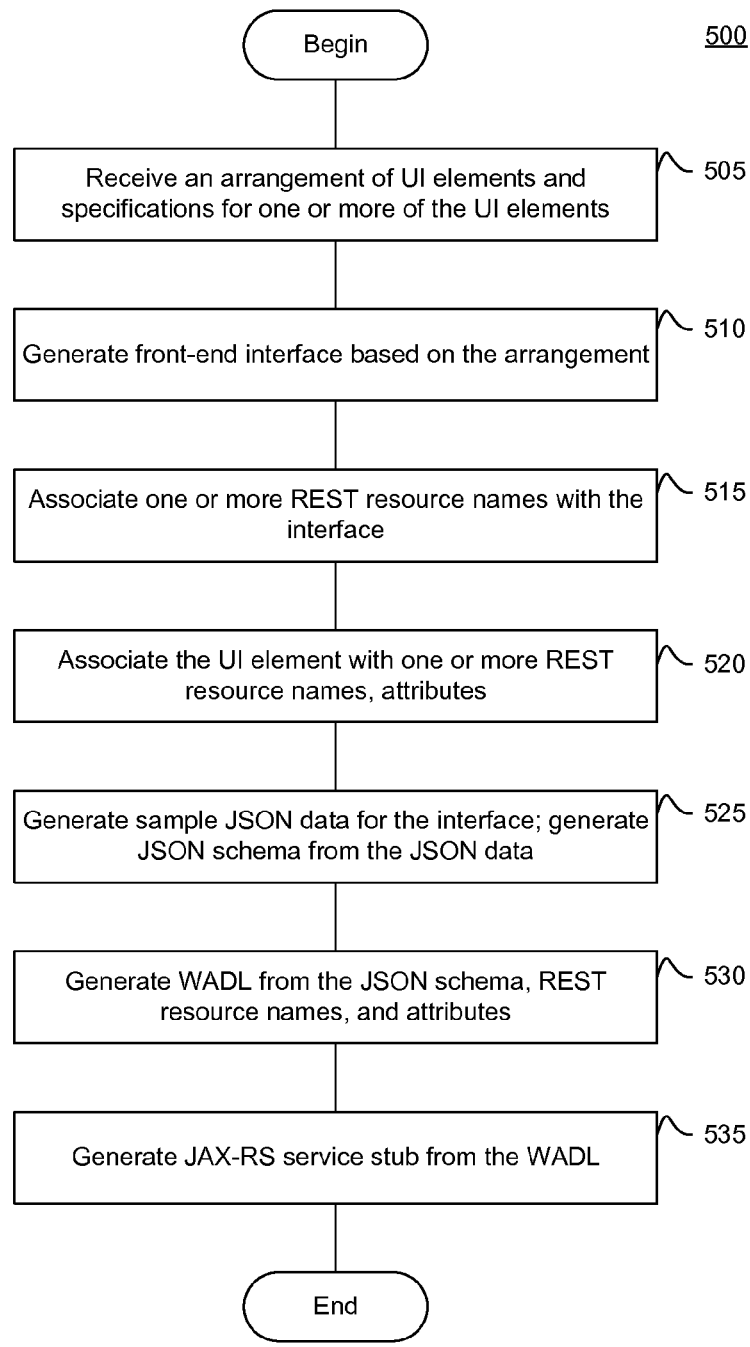
FIG. 5 illustrates a method for generating a web application that includes a UI and server components, according to one embodiment.

FIG. 5 illustrates a method 500 for generating a web application that includes a UI and server components, according to one embodiment. At step 505, the UI design tool 109 receives an arrangement of UI elements. For example, the front-end developer may design a user management page that includes buttons labelled Get, Update, Create, and Delete. The UI design tool 109 may also receive specifications describing functions and classifications of one or more of the UI elements. In this example, the front-end developer may specify CRUD actions for HTTP GET, PUT, POST, and DELETE, respectively, for each button. At step 510, the UI design tool 109 generates a front-end UI based on the arrangement of UI elements.

At step 515, the UI design tool 109 associates one or more REST resource names for the interface. If the application interface includes multiple pages, the UI design tool 109 associates one or more REST resource names for each page. At step 520, the UI design tool 109 then associates each UI element with one or more REST resource names, properties, and attributes. Continuing the previous example, the UI design tool 109 associates the specified CRUD actions to the buttons of the UI.

At step 525, the UI design tool 109 generates JSON data for the interface. For example, the UI design tool 109 maps each UI element to a given JSON array. The UI design tool 109 may also map each page of the UI to a JSON object name. The UI design tool 109 can then generate sample data for each page in the UI, e.g., form fields, grid rows, and the like. Further, the UI design tool 109 generates a schema from the JSON data. As stated, the JSON schema describes how the application communicates data to the back-end service.

At step 530, the UI design tool 109 generates a WADL from the JSON schema, REST resource names, and properties. The WADL specifies requirements for RESTful web services and CRUD actions provided by each element. At step 535, the UI design tool 109 generates a JAX-RS service stub from the WADL. When compiled, the JAX-RS service stub is a functioning application that includes the UI and the server components associated with each UI element. The JAX-RS service stub may include an empty Provider class which the back-end developer can later implement to connect the application to a server or a database.

Figure 6:
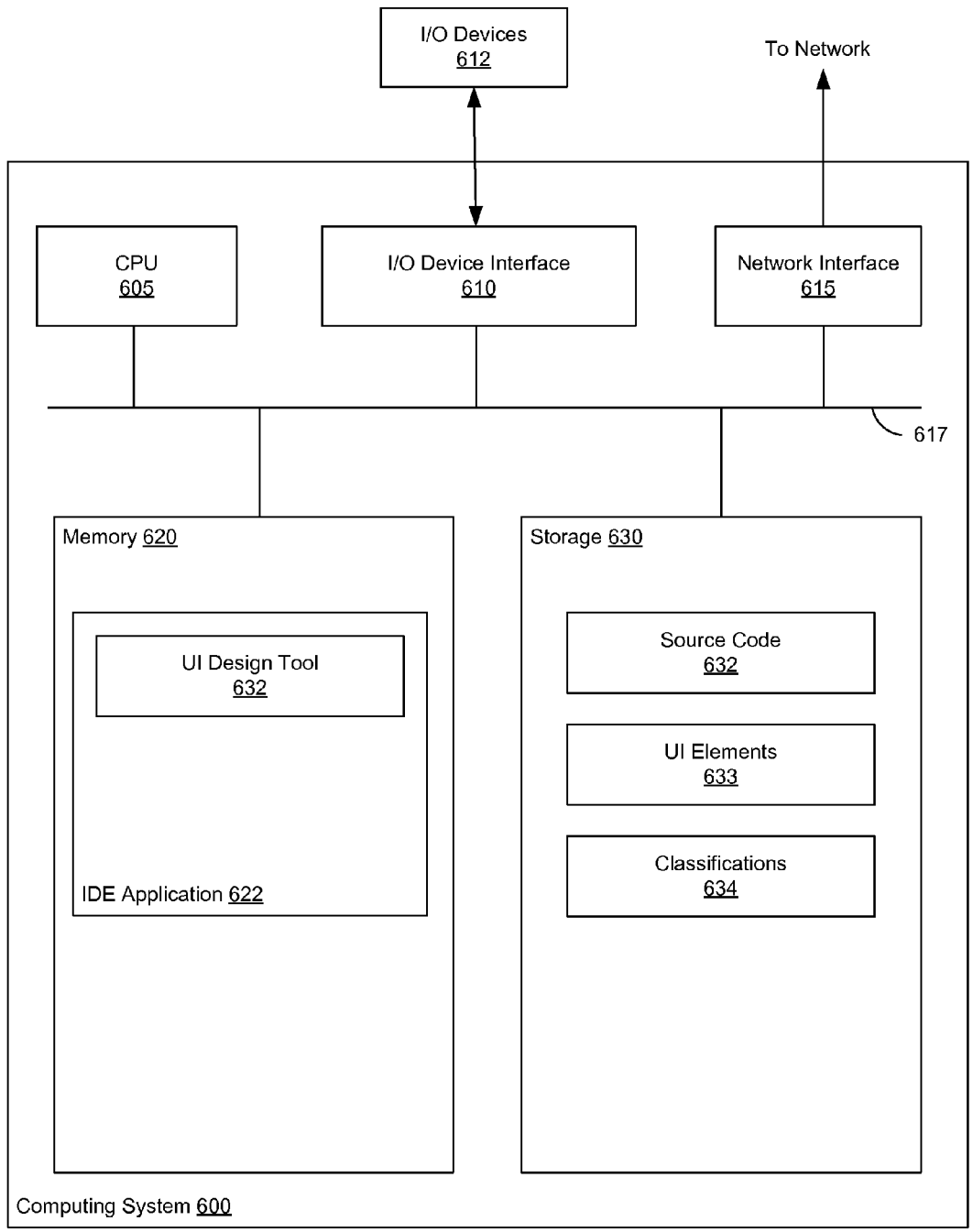
FIG. 6 illustrates a computing system configured to generate a web application that includes a UI and server components, according to one embodiment.

FIG. 6 illustrates a computing system 600 configured to generate an end-to-end web application that includes a UI and server components, according to one embodiment. As shown, the computing system 600 includes, a central processing unit (CPU) 605, a network interface 615, a memory 620, and storage 630, each connected to a bus 617. The computing system 600 may also include an I/O device interface 610 connecting I/O devices 612 (e.g., keyboard, display and mouse devices) to the computing system 600. Further, in context of this disclosure, the computing elements shown in the computing system 600 may correspond to a physical computing system (e.g., a desktop computer, laptop computer, etc.) or may be a virtual computing instance executing within a computing cloud.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 617, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes an IDE application 622. And storage 630 includes source code 632, UI elements, and classifications 634. The IDE application 632 allows a developer to create and edit source code 632 for an application. The IDE application 622 itself includes a UI design tool 632. The UI design tool 632 allows the developer to create a UI for an end-to-end web application, e.g., by dragging and dropping UI elements 633 onto a canvas representing a UI page of the web application. In one embodiment, the developer may specify one or more classifications 634 of server properties to associate with each UI element 633 used in the web application. The server properties include REST resource names, JSON names, target URL attributes, CRUD actions, and the like. The UI design tool 632, thereafter, generates a WADL from such classifications and JSON data. The design tool 632 generates a JAX-RS service stub from the WADL. A back-end developer may implement a remaining Provider class in the JAX-RS service stub. The compiled service stub represents a functional web application.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access IDE application 107 or related data available in the cloud. For example, the UI design tool 109 could execute on a computing system in the cloud and generate an end-to-end web application that includes a UI and server components to support UI elements. In such a case, the UI design tool 109 could classify server properties (e.g., REST resource names, target URLs, JSON data) and store a resulting JAX-RS service stub at a storage location in the cloud. Doing so allows a user to access this information from any computing system attached to a network connected to the cloud (e.g., the Internet).

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A method for generating a web application, comprising:
   generating a first application, wherein the first application includes a UI having one or more UI elements;
   mapping one or more server properties to each of the UI elements;
   generating a data schema from the mapped one or more server properties by generating one or more data samples for each of the mapped server properties and UI elements;
   generating a machine-readable description of the data schema and the mapped one or more server properties; and
   generating a second application from the machine-readable description, wherein the second application implements the UI of the first application and the machine-readable description.

2. The method of claim 1, wherein the server properties for each UI element includes at least one of a REST (Representational State Transfer) resource name, a CRUD (create, read, update, delete) action, and a target URL attribute.

3. The method of claim 1, wherein
   the one or more data samples includes at least one of a form field or a grid row.

4. The method of claim 3, wherein the one or more data samples and the data schema are formatted in JSON (Javascript Object Notation).

5. The method of claim 1, wherein the machine-readable description is formatted in WADL (Web Application Description Language).

6. The method of claim 1, wherein the second application is a JAX-RS (Java API for RESTful Web Services) service stub.

7. The method of claim 1, further comprising:
   connecting the second application with a data store.

8. A computer program product, comprising:
   a non-transitory computer-readable storage medium having computer-readable program code embodied therewith, the computer-readable program code configured to perform an operation for generating a web application, the operation comprising:
      generating a first application, wherein the first application includes a UI having one or more UI elements,
      mapping one or more server properties to each of the UI elements,
      generating a data schema from the mapped one or more server properties by generating one or more data samples for each of the mapped server properties and UI elements,
      generating a machine-readable description of the data schema and the mapped one or more server properties, and
      generating a second application from the machine-readable description, wherein the second application implements the UI of the first application and the machine-readable description.

9. The computer program product of claim 8, wherein the server properties for each UI element includes at least one of a REST (Representational State Transfer) resource name, a CRUD (create, read, update, delete) action, and a target URL attribute.

10. The computer program product of claim 8, wherein
    the one or more data samples includes at least one of a form field or a grid row.

11. The computer program product of claim 10, wherein the one or more data samples and the data schema are formatted in JSON (Javascript Object Notation).

12. The computer program product of claim 8, wherein the machine-readable description is formatted in WADL (Web Application Description Language).

13. The computer program product of claim 8, wherein the second application is a JAX-RS (Java API for RESTful Web Services) service stub.

14. The computer program product of claim of claim 8, wherein the operation further comprises:
    connecting the second application with a data store.

15. A system, comprising:
    a processor; and
    a memory storing a program, which, when executed on a processor, performs an operation for generating a web application, the operation comprising:
       generating a first application, wherein the first application includes a UI having one or more UI elements,
       mapping one or more server properties to each of the UI elements,
       generating a data schema from the mapped one or more server properties by generating one or more data samples for each of the mapped server properties and UI elements,
       generating a machine-readable description of the data schema and the mapped one or more server properties, and
       generating a second application from the machine-readable description, wherein the second application implements the UI of the first application and the machine-readable description.

16. The system of claim 15, wherein the server properties for each UI element includes at least one of a REST (Representational State Transfer) resource name, a CRUD (create, read, update, delete) action, and a target URL attribute.

17. The system of claim 16, wherein
    wherein the one or more data samples includes at least one of a form field or a grid row.

18. The system of claim 17, wherein the one or more data samples and the data schema are formatted in JSON (Javascript Object Notation).

19. The system of claim 15, wherein the machine-readable description is formatted in WADL (Web Application Description Language), and wherein the second application is a JAX-RS (Java API for RESTful Web Services) service stub.

20. The system of claim 15, wherein the operation further comprises:
   connecting the second application with a data store.

\* \* \* \* \*